United States Patent
Der et al.

(10) Patent No.: US 10,277,059 B2
(45) Date of Patent: Apr. 30, 2019

(54) WIRELESS BATTERY CHARGER

(71) Applicant: WITRICITY CORPORATION, Watertown, MA (US)

(72) Inventors: Lawrence Der, Lexington, MA (US); Sanjay Gupta, Bedford, MA (US)

(73) Assignee: WiTricity Corporation, Watertown, MA (US)

( * ) Notice: Subject to any disclaimer, the term of this patent is extended or adjusted under 35 U.S.C. 154(b) by 105 days.

(21) Appl. No.: 15/495,750

(22) Filed: Apr. 24, 2017

(65) Prior Publication Data

US 2018/0309315 A1 Oct. 25, 2018

(51) Int. Cl.
| | |
|---|---|
| *H02J 7/00* | (2006.01) |
| *H02J 7/02* | (2016.01) |
| *H02J 50/12* | (2016.01) |
| *H02J 7/06* | (2006.01) |
| *H02J 7/04* | (2006.01) |
| *H02J 7/10* | (2006.01) |

(52) U.S. Cl.
CPC .............. *H02J 7/025* (2013.01); *H02J 7/045* (2013.01); *H02J 7/047* (2013.01); *H02J 7/06* (2013.01); *H02J 50/12* (2016.02); *H02J 2007/0098* (2013.01); *H02J 2007/10* (2013.01)

(58) Field of Classification Search
USPC ........................................................ 320/108
See application file for complete search history.

(56) References Cited

U.S. PATENT DOCUMENTS 4,628,242 A * 12/1986 Scholefield ........... H02J 7/0042
320/106
5,876,425 A  3/1999 Gord et al.
(Continued)

FOREIGN PATENT DOCUMENTS

WO  2015009328  1/2015
WO  2017019294  2/2017

OTHER PUBLICATIONS

InTech; Hoang, Huy; Bien, Franklin; "Maximizing Efficiency of Electromagnetic Resonance Wireless Power Transmission Systems with Adaptive Circuits"; South Korea Jan. 25, 2012.
(Continued)

*Primary Examiner* — Samuel Berhanu
(74) *Attorney, Agent, or Firm* — Gregory M. Howison

(57) ABSTRACT

A wireless battery charging system includes an inductive receiving member for receiving an AC signal for output to a matching circuit having a variable impedance with variable matching parameters. The output of the matching circuit drives a rectifier circuit for converting the inputted AC signal to a first DC voltage and having variable rectifier parameters to vary the voltage drop thereacross. A DC-to-DC converter for converting the first DC voltage to a regulated voltage for charging the battery. A current sensor senses current through the inductive receiving member, rectifier circuit and DC-to-DC converter. A controller senses the voltage drop across each of the matching circuit, rectifier circuit and DC-to-DC converter and the current there through to determine power dissipation in each of the matching circuit, rectifier circuit and DC-to-DC converter. The power distribution in each of the matching circuit, the rectifier circuit and the DC-to-DC converter can then be varied.

19 Claims, 12 Drawing Sheets

(56) References Cited

U.S. PATENT DOCUMENTS

| | | | |
|---|---|---|---|
| 6,536,726 | B1 | 3/2003 | Tull |
| 9,384,885 | B2 | 4/2016 | Karalis et al. |
| 9,496,741 | B2 | 11/2016 | Lee et al. |
| 2009/0001932 | A1 | 1/2009 | Kamijo et al. |
| 2012/0223590 | A1* | 9/2012 | Low .................. H02J 5/005 307/104 |
| 2013/0026849 | A1 | 1/2013 | Ohta et al. |
| 2013/0033118 | A1 | 2/2013 | Karalis et al. |
| 2014/0015478 | A1 | 1/2014 | Von Novak |
| 2014/0312708 | A1 | 10/2014 | Takahashi |
| 2015/0229135 | A1 | 8/2015 | Porat et al. |
| 2015/0326143 | A1 | 11/2015 | Petras et al. |
| 2016/0254679 | A1* | 9/2016 | Liu .................. H02J 7/025 307/104 |
| 2016/0352134 | A1 | 12/2016 | Pawar et al. |
| 2016/0352152 | A1 | 12/2016 | Karalis et al. |

OTHER PUBLICATIONS

Hindawi Publishing Corporation, International Journal of Antennas and Propagation; Luo, Yanting; Yang, Yongmin; Chen, Suiyu; Wen, Xisen; "A Frequency-Tracking and Impedance-Matching Combined System for Robust Wireless Power Transfer". Jan. 29, 2017.

Department of Electronics and Radio Engineering, Kyung Hee University; Lee, Jong-Wook; Duong, Thuc Phi; "A Dynamically Adaptable Impedance-Matching System for Midrange Wireless Power Transfer with Misalignment"; South Korea Jul. 27, 2015.

Energies; Lu, Yan; Dongsheng, Brian Ma; "Wireless Power Transfer System Architecture for Portable or Implantable Applications" Dec. 19, 2016.

The University of Tokyo; Kato, Masaki; Imura, Takehiro; Hori, Yoichi; "Study on Maximize Efficiency by Secondary Side Control Using DC-DC Converter in Wireless Power Transfer via Magnetic Resonant Coupling"; Barcelona, Spain. Nov. 17, 2013.

Georgia Institute of Technology; Rincon-Mora, Gabirel Alfonso; "Current Efficient, Low Voltage, Low Drop-out Regulators". Nov. 1, 1996.

SMPS European Application Lab, International Rectifier; Giacomini, Davide; Chine, Luigi; "A novel high efficient approach to input bridges"; Nuremberg, Germany. May 27, 2008.

Piers Proceedings; Waters, B. H.; Sample, A. P.; Smith, J. R.; "Adaptive Impedance Matching for Magnetically Coupled Resonators"; Moscow, Russia. Aug. 19, 2012.

* cited by examiner

WIRELESS BATTERY CHARGER

TECHNICAL FIELD

This application relates in general to battery chargers and, more particularly, battery chargers utilized in Wireless Power Transfer (WPT) systems.

BACKGROUND

Wireless charging, also known as Wireless Power Transfer (WPT), is a technology that enables a power source to transmit electromagnetic energy to an electrical load across a gap, without interconnecting cords. Two directions for WPT are radiative wireless charging, which transfers energy via, for example, radiating electromagnetic, ultrasound, or acoustic waves and non-radiative charging, which transfers energy via an oscillating electromagnetic field.

Wireless power transmission systems can include a power transmitter unit (PTU) and power receiver unit (PRU). The transmitter can include components to supply power to a transmitter resonator coil which is coupled to a receiver resonator coil in a receiver. The receiver can be coupled to one or more loads, such as those of a mobile electronic device, medical device, vehicle, etc. It can be beneficial to have some type of communication path between the receiver and the transmitter in order to conserve efficiency.

When a PRU is associated with a device having a battery, charging that battery can put an undue burden on the distribution of heat across the PRU, due to converting the coupled voltage from the PTU over to the load, requiring the conversion of an alternating voltage to a regulated DC voltage. In particular, the voltage regulation circuitry of the PRU can be the main portion of the circuitry that dissipates heat, due to the voltage regulation circuitry dropping the voltage from a relatively high input voltage to a lower voltage when the battery is somewhat depleted. Further, during operation, the input voltage to the PRU from the PTU can vary, also potentially resulting in high power dissipation in the voltage regulation circuitry of the PRU.

SUMMARY

The present invention disclosed and claimed herein, in one aspect thereof, comprises a wireless battery charging system includes an inductive receiving member for receiving an AC signal for output to a matching circuit having a variable impedance with variable matching parameters. The output of the matching circuit drives a rectifier circuit for converting the inputted AC signal to a first DC voltage and having variable rectifier parameters to vary the voltage drop thereacross. A DC-to-DC converter for converting the first DC voltage to a regulated voltage for charging the battery. A current sensor senses current through the inductive receiving member, rectifier circuit and DC-to-DC converter. A controller senses the voltage drop across each of the matching circuit, rectifier circuit and DC-to-DC converter and the current there through to determine power dissipation in each of the inductive receiving member, rectifier circuit and DC-to-DC converter. The power distribution in each of the matching circuit, the rectifier circuit and the DC-to-DC converter can then be varied.

BRIEF DESCRIPTION OF THE DRAWINGS

For a more complete understanding, reference is now made to the following description taken in conjunction with the accompanying Drawings in which.

DETAILED DESCRIPTION

Figure 1:
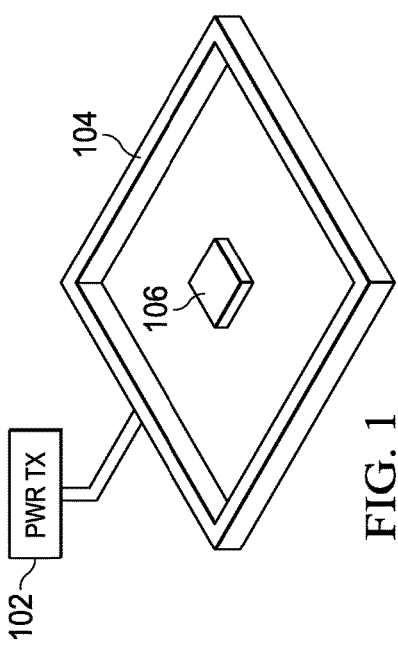
FIG. 1 illustrates a diagrammatic view of a charging system for a Wireless Power Transfer system.

Referring now to the drawings, wherein like reference numbers are used herein to designate like elements throughout, the various views and embodiments of a wireless battery charger are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a diagrammatic view of a Wireless Power Transfer (WPT) charging system. There is provided a power transmitter 102, which generates a driving voltage to a coil 104 which can be placed on a surface or in proximity to some surface. A device to be charged 106 has a battery (not shown) associated there with that is to be charged merely by placing the device 106 within the magnetic field of the coil 104. As will be described hereinbelow, the device 106 has an associated coil for interfacing with the coil 104.

As will also be disclosed herein below, when the device 106 has a partially or completely depleted battery, there may be a provision for a proximity sensor to sense the presence of the device 106 within a certain distance of the coil 104 or, alternatively, there may be a switch on the power transmitter 102 in order to allow for activation of the transmitter 102 when an operation initiating a charge cycle is desired. In typical WPT systems, the power transmitter 102 is in and idle mode and generates a Beacon that looks for some signal from the device 106 in an out of band communication requesting power. In a fully depleted battery mode, this may not be possible and, thus, there must be some way for the power transmitter 102 to increase its power to a level to at least initiate a charging cycle, as will be described in more detail hereinbelow.

Figure 2:
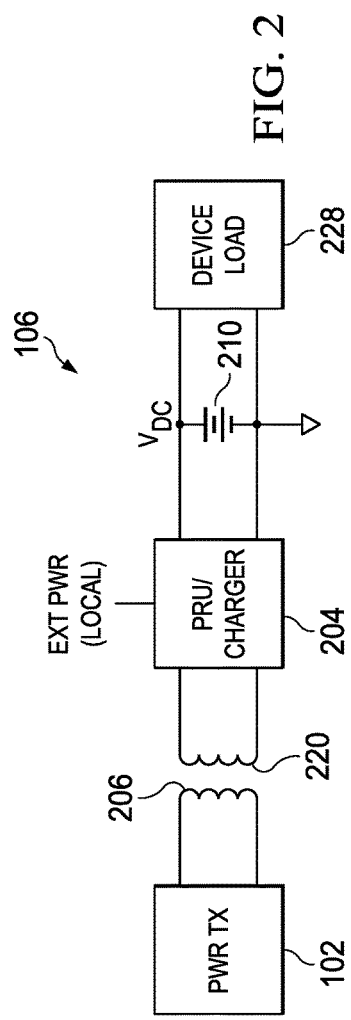
FIG. 2 illustrates a simplified diagrammatic view of the Power Receiving Unit interface with the battery and a device load.

Referring now to FIG. 2, there is illustrated a block diagram of an overall WPT system. A WPT system includes the power transmitter 102 which is referred to as the Power Transmitter Unit (PTU) which drives a transmitting coil 206. The device 106 has associated therewith a receiving coil 220 for receiving a signal from the PTU 102 and which coil is associated with a Power Receiving Unit (PRU) 204. This PRU 204 is operable to provide a DC voltage to a battery 210 which can be used to drive a device load 228. Thus, by placing receiving coil 220 in the resonant magnetic field of the transmitter coil 206, energy will be received by the PRU 204 to charge the battery 210.

Figure 3:
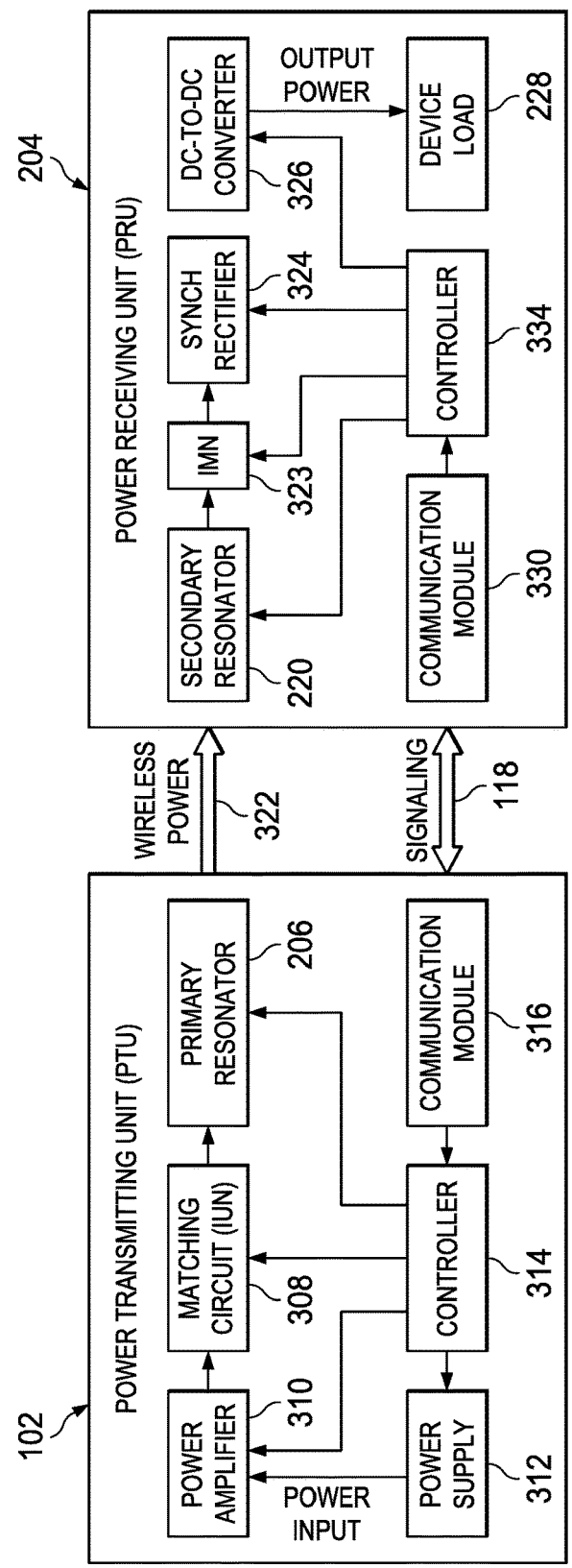
FIG. 3 illustrates a block diagram of a Power Transmitting Unit and a Power Receiving Unit interface with each other to provide an overall Wireless Power Transfer system.

Referring now to FIG. 3 there is illustrated a block diagram of a Wireless Power Transfer (WPT) system that includes a Power Transmitting Unit (PTU) 102 that interfaces with a Power Receiving Unit (PRU) 204. The wireless power is transferred from the PTU 102 to the PRU 204.

The PTU 102 includes a primary resonator, the coil 206, that generates an oscillating magnetic field to wirelessly transmit power to the PRU 204. A matching circuit 308 is provided for interfacing between a power amplifier 310 and the primary resonator 206. A power supply 312 is provided for generating power from an external source for input to the power amplifier 310. A controller 314 is provided for controlling the power supply 312, the power amplifier 310, and the matching circuit 308 and the primary resonator 306. The controller 314 interfaces with a communication module 316 in order to communicate with the PRU 204 over a bidirectional signaling path 318.

The PRU 204 includes a secondary resonator, the coil 220, interfacing with the primary resonator 206 of the PTU 102 via a wireless power path 322. The output of the secondary resonator 220 is input to a matching network 323, referred to as an Impedance Matching Network (IMN), and then to the input of asynchronous rectifier 324 for rectifying the output to a DC level, which is then input to a DC-to-DC converter 326. This comprises the output power which is then input to the device load 228. It should be understood that multiple loads could be interfaced with the DC-to-DC converter 326. A communication module 330 is operable to interface with the PTU 102 and the communication module 316 associated therewith via the signaling path 318. A controller 334 is provided on the PRU 204 for interfacing with the secondary resonator 220, the rectifier 324, the communication module 130 and the DC-to-DC converter 126.

The communication modules 316 and 330 provide for feedback signaling between the PRU 204 and the PTU 102 for the purpose of controlling the charging operation. The wireless power is generated at approximately 6.78 MHz of the Industrial Scientific Medical (ISM) frequency band. The communication on the signaling path 318 can be facilitated, for example, over an out-of-band communication path for control signaling and operates at the 2.4 GHz ISM band. For example, this out-of-band communication path can be via Bluetooth (BLE), Wifi, or radio. Alternatively, load modulation can be provided which is referred to as "in-band communication." This is facilitated by inducing a load on the coil 220.

The PTU 102 can operate in multiple functional states. One functional state is the Configuration state in which the PTU 102 does a self-check, one is the PTU Power Save state, in which the PTU 102 periodically detects changes in impedance at the primary resonator and one is the PTU Low Power state, in which the PTU 102 establishes a data connection with PRU(s). Another state is the PTU Power Transfer state, in which the PTU 102 can regulate power transfer. Another is the Local Fault State, which happens when the PTU 102 experiences any local fault conditions such as over-temperature. Another is the PTU Latching Fault state, which happens when rogue objects are detected, or when a system error or other failures are reported.

The PRU 104 also has a number of functional states. One is the Null State, when the PRU 204 is under-voltage, one is the PRU Boot state, when the PRU 204 establishes a communication link with the PTU 102, one is the PRU On state, when communication is performed, one is the PRU System Error State, when there is an over-voltage, over-current, or over-temperature alert, or when there is an error that has to shut down the power.

An exemplary communication protocol, used to support wireless charging functionality, can be via a Bluetooth Low Energy (BLE) link for the control of power levels, identification of valid loads, and protection of non-compliant devices. There can be three steps in the communication protocol, the first being device detection, the second being information exchange, and the third being charging control. With respect to device detection, the PTU 102 can beacon power until a PRU 104 broadcasts advertisements. The PTU 102 can reply to the PRU advertisements with a connection request. The information exchange allows the PTU 102 and PRU 204 to exchange their static and dynamic parameters. The charging control is initiated when the PTU 102 can provide sufficient power to meet the demand requested from the PRU 204, or when the PRU 204 is authorized to receive energy. With respect to situations wherein there is insufficient charge on the PRU 204 to respond to a Beacon signal, there must be some way to force the PTU 102 to increase the amount of power it is transmitting, as the amount of power transmitted via the beacon signal may be insufficient to provide sufficient power to the PRU 204 for communication purposes. This operation will be described in more detail hereinbelow.

Figure 4:
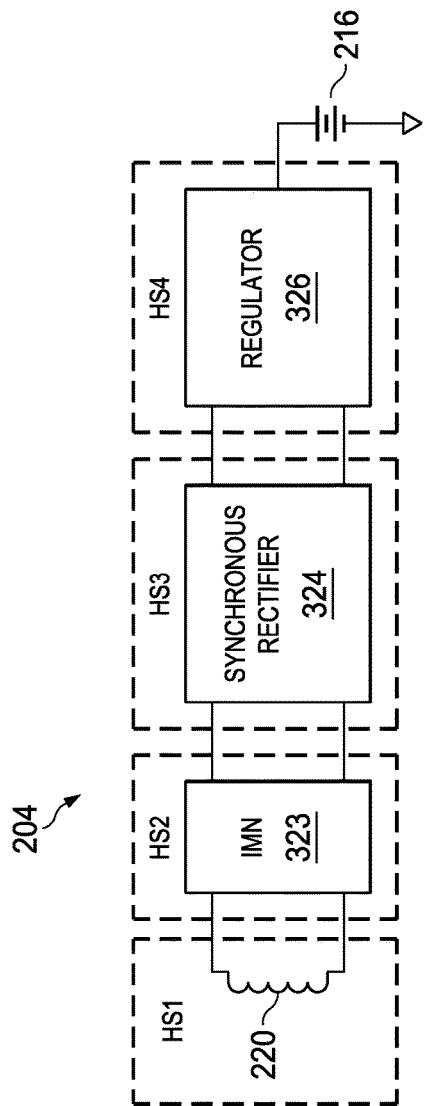
FIG. 4 illustrates a more detailed simplified block diagram of the Power Receiving Unit illustrating the various circuitry and the heat dissipation distribution.

Referring now to FIG. 4, there is illustrated a simplified block diagram of the PRU 204 illustrating the overall distribution of power dissipation in the power delivery chain. The first lossy component is the coil 220. This is referred to as a heat source, HS1. The coil 220 incurs loss merely due to the current there through. The generated therein can be a function of the series resistance of the wire utilized to form the coil 220, some magnetic misalignment of the coil 220 with respect to the primary coil 206. In any event, this is a fixed amount of loss resulting in heat. The second source of heat loss is the matching network 323, referred to as a heat source, HS2. The matching network 323 is formed primarily of reactive components that will have some heat loss associated therewith due to how efficiently they are configured. The third source of heat loss is the synchronous rectifier 324, referred to as a heat source, HS3. The last source of heat loss is the regulator 326, referred to as a heat source, HS4.

Figure 5:
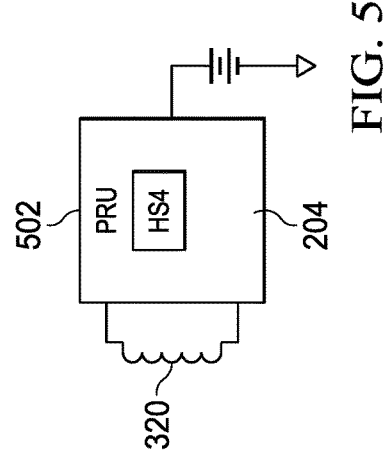
FIG. 5 illustrates a diagrammatic view of an overall battery control device incorporating a Power Receiving Unit and a detail of the regulator embedded in the system.

In an ideal situation, the PRU 204 will have the matching network 323 and the synchronous rectifier 324 designed to minimize the amount of loss there through. Thus, if the system is operating correctly, the amount of power delivered by the PTU 102 will be reduced such that the voltage on the input to the regular 326 is the minimum required to maintain regulation and provide the power requested by the overall battery 216 for charging. However, if the power is too high, there is a feedback loop through the communication channel that is required to inform the PTU 104 to either lower or raise the power. Further, there can be other devices within the magnetic field of the coil 106, interfacing with the PTU 104 requesting power. Thus, the result is that there may be excess power input to the coil 220, resulting in a higher voltage at the input of the regulator 326. Of course, the regulator 326 can adequately regulate the voltage or current delivered to the battery 216. The result, however, is that a larger voltage drop will result across a regulator 326, thus resulting in a higher heat dissipation in the regulator 326, i.e., a higher level of heat dissipated in the heat source, HS4. The regulator 326, of course, can be designed to handle this kind of heat load. The issue that exists, however, is further elaborated in the illustration of FIG. 5. The PRU 204 illustrated in FIG. 5 is defined by a boundary 502 defining, for example, the boundaries of a chip and whatever circuitry may be associated with that chip, or even defining an enclosed and tightly populated PC board. Each of these examples illustrates a device that will have a certain limited capability for dissipating heat. The possibility therefore exists that certain heat sources may have difficulty in dissipating heat associated therewith. In this illustration, the regulator 326, i.e., heat source, HS4, is illustrated in the center of the boundary 502. In practice, it is first desirable to improve the efficiency by changing the voltage at the various points, i.e., the voltage across the Impedance Matching Network, the voltage across the Synchronous Rectifier and the voltage across the regulator 326. From a minimal control approach, to get the best efficiencies one would design the circuit to work at the highest output voltage as possible and minimize the voltage drop across the regulator 326, which is a buck regulator in one embodiment. Simulations show the efficiency of the buck regulator 326 or DC-to-DC converter improve when there is less voltage drop between the input and output voltage. The Synchronous Rectifier 324 has improved efficiencies when the rectified output voltage is as large as it can be. Thus, one trade off would be to operate at the largest output voltage as this moves all of the voltages up. A battery application, however, may be limited by the battery voltage but if series batteries could be utilized, this would improve the efficiency because the output voltage can be higher. This allows operation at the highest allowable Vout to minimize the drop on the DC-to-DC stage. If that is not able to be achieved, then it is desirable that all of the heat not be centered in this particular area of the regulator 326 defined by the heat source. By distributing the efficiency across the various input devices between the output of the coil and the output of the regulator 326, heat dissipation can be distributed over the overall chip. However, in certain situations, the voltage output by the transmitter could be excessively high and, therefore, it will be desirable not to have a high-voltage presented to the input of the chip. In that situation, it would be desirable to distribute the heat across other circuitry or structures within the boundary 502 of the overall PRU 204. Thus, distributing the heat to the synchronous rectifier 324 or the matching network 323 would be desirable.

Figure 6:
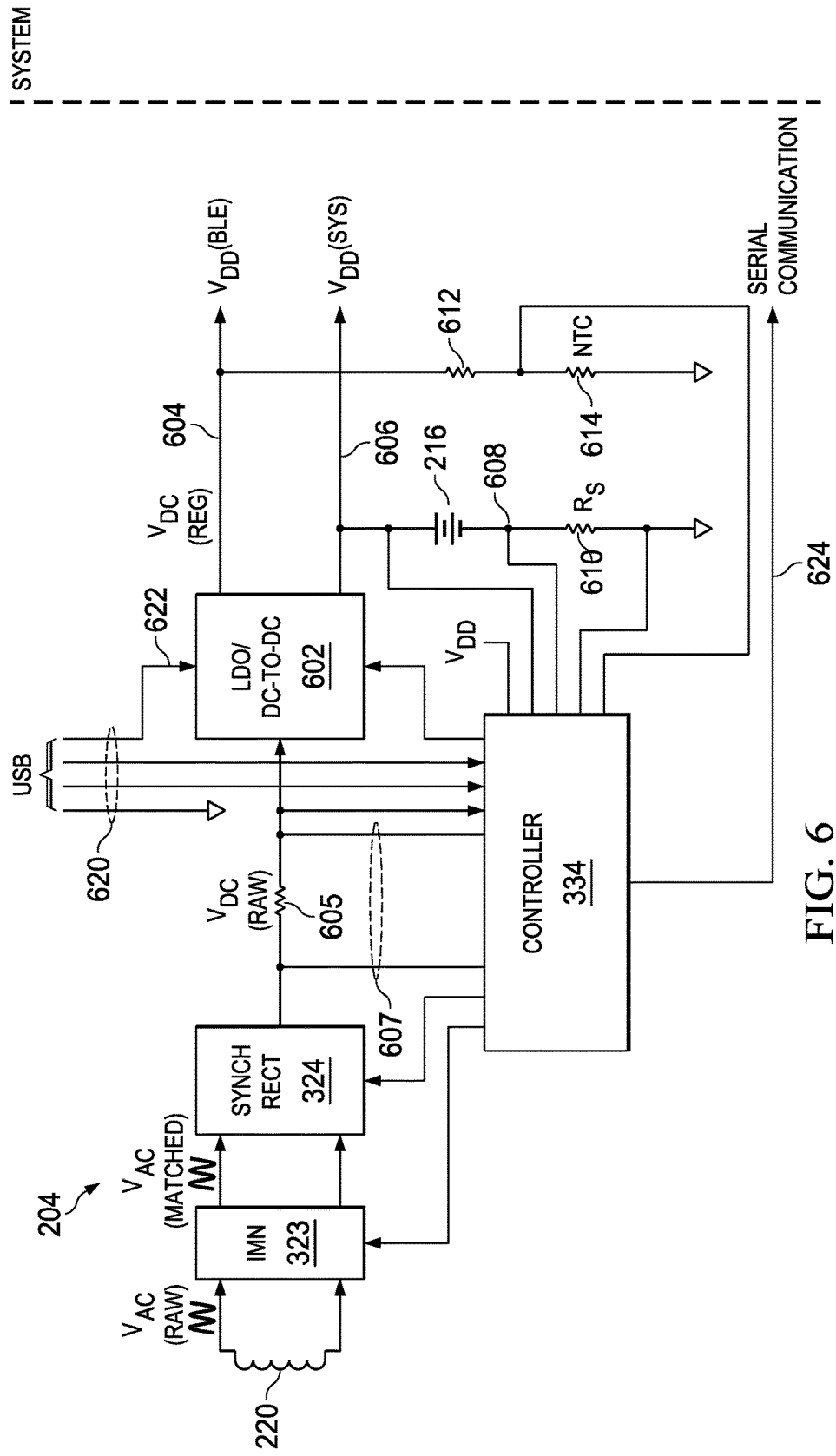
FIG. 6 illustrates a block diagram of the overall Power Receiving Unit.

Referring now to FIG. 6, there is illustrated a more detailed diagram of the PRU 204. In order to distribute heat, what will be disclosed herein is the ability to vary the configuration of both the synchronous rectifier 324 and the matching network 323 in accordance with a predetermined power distribution configuration tables. By doing so, loss is distributed to these devices in the form of a voltage drop across these devices and, with knowledge of the current through the devices, the voltages across these devices and also heat dissipated through any device, as determined by an external heat sensor such as a thermistor to determine device temperatures and delta device temperatures, the subsequent power distribution in each of the devices can be determined/estimated. The purpose is to control the voltage drop across these two devices in order to drop the voltage between the output of the coil 220 and the input to the regulator 326, wherein the voltage to the input of the regulator can be adjusted in order to actually control the amount of power dissipated therein. Thus, the voltage drop across the regulator 326 can be controlled at the PRU 204 somewhat independent of the actual voltage output of the coil 220.

The controller 334 also has a memory (not shown) associated therewith. As noted hereinabove, the controller 334 can be realized with a Micro Controller Unit, which has an onboard non-volatile memory such as Flash memory associated there with. The predetermined configuration information is stored herein. However, the controller 334 has the capability of adaptively changing this configuration information depending upon the various parameters associated with the operation of the device.

As illustrated in FIG. 6, the AC voltage output by the coil 220 is labeled $V_{AC(RAW)}$ and the output of the matching network 323 is labeled $V_{AC\ (MATCHED)}$. The output of the synchronous rectifier 324 is labeled with a DC voltage, $V_{DC\ (RAW)}$. The Current Shunt monitor resistor 605 is provided in series between the output of the synchronous rectifier 324 and the input to the DC-to-DC converter 602, there being two sensing lines 607 input to the controller 334 for sensing the differential voltage across this current shunt resistor 605 to provide an indication of series current in the system. This is the voltage input to the regulator 326, which is illustrated as a DC-to-DC converter 602 combined with an LDO (Low-Dropout regulator). This DC-to-DC regulator 602 provides a first output on a line 604 which is the LDO output labeled $V_{DD(BLE)}$, which is a regulated voltage that provides the power supply for the BLE in the communication module 330. This will be described in more detail hereinbelow. A second voltage output is provided on a line 606 from the DC-to-DC converter 602 providing a system supply voltage is labeled $V_{DD(SYS)}$. This second voltage output is a regulated voltage is controlled by the operation of the DC-to-DC converter, wherein the voltage on the output line 604 is controlled by the linear regulator, i.e., the LDO regulator.

The operation of the overall PRU 204 is controlled by the central controller 334. The central controller 334 provides both a monitoring and a control function. For monitoring, the controller 334 senses and input from a temperature measurement device, which is formed from series connected resistors 612 and an NTC resistor 614 disposed between nodes 604 and ground, resistor 614 basically being a thermistor. The top end of resistor 612 is connected to node 604, as this is a regulated voltage independent of the voltage across the battery 216 which, in a depleted state, could be much lower than a fixed regulated voltage value. The NTC resistor 614 is disposed proximate the battery 216 for the purpose of providing information regarding the temperature thereof. The battery 216 is connected between the line 606 and a node 608, node 608 connected to one side of the temperature sensing resistor 610, labeled $R_S$, the other side of resistor 610 connected to ground. The resistor 610 is a low value resistor, the voltage thereacross providing indication of the current through the battery 216. The voltage on the node 608 is sensed by the controller 334, this being a current sense input. The voltage on the top plate of the battery 216 is also provided as an input sensed voltage. The voltage on the input to the DC-to-DC converter 602 is also provided as a sensed input voltage to the controller 334. Thus, the controller 334 has the ability to not only sense the voltage across the DC-to-DC converter 602, but also sense the current and voltage ($V_{DD(SYS)}$-$V_{NODE\ 608}$) for the battery 216 and the temperature of the battery.

From a control standpoint, the controller 334 controls the matching network 323, the synchronous rectifier 324 and the DC-to-DC converter 602, and the controller 334 can also provide messages to the PTU for the purpose of controlling the field strength, noting that this involves a much slower control. The matching network 323 and the synchronous rectifier 324 are all variable as to the parameters thereof such that the voltage drop their across can be modified. This modification is for the purpose of actually increasing the voltage drop thereacross.

In addition, the overall device to be charged incorporating the battery 216 and the PRU 204 includes an external USB interface 620 that is comprised of a power and ground voltage lines, a voltage line, and two data lines. This allows an external data and power source to be connected to the device. The two data lines are input to the controller 334 and the power line, on a line 622, is input to the DC-to-DC converter 602. An additional serial communication line 624 is provided from the controller 334 to the system. Thus, there is provided a regulated voltage on a line 604 independent of the battery 216, which voltage on line 604 can be output even when the battery 216 is depleted and the voltage on node 606 is too low to power the system that can power the BLE for communication purposes, thus preventing it from actually powering the BLE. This voltage on node 604 will also provide voltage to the controller 334, the controller 334 typically having its own internal LDO regulator. The serial communication line 624 is utilized to allow the controller 334 to communicate with BLE communication module 330. More than one communication line could be provided to allow the controller 334 to communicate with the system. Once the battery is charged and the voltage on the battery rises above a predetermined threshold sufficient to power the system, the system can be powered on. The system may independently power up when the voltage reaches a predefined level, all of this being under control of the system separate and apart from the PRU 204.

The controller 334 can be realized with a microcontroller of the type, for example, a EFM32WG230 microcontroller manufactured by Silicon Labs, Inc. This is a typical microcontroller which includes a centralized ARM processor, a 32-bit data bus, on board FLASH nonvolatile memory, various communication interfaces, various analog interfaces such as ADCs and DACs, etc. The system also has a built-in USB interface.

Figure 7:
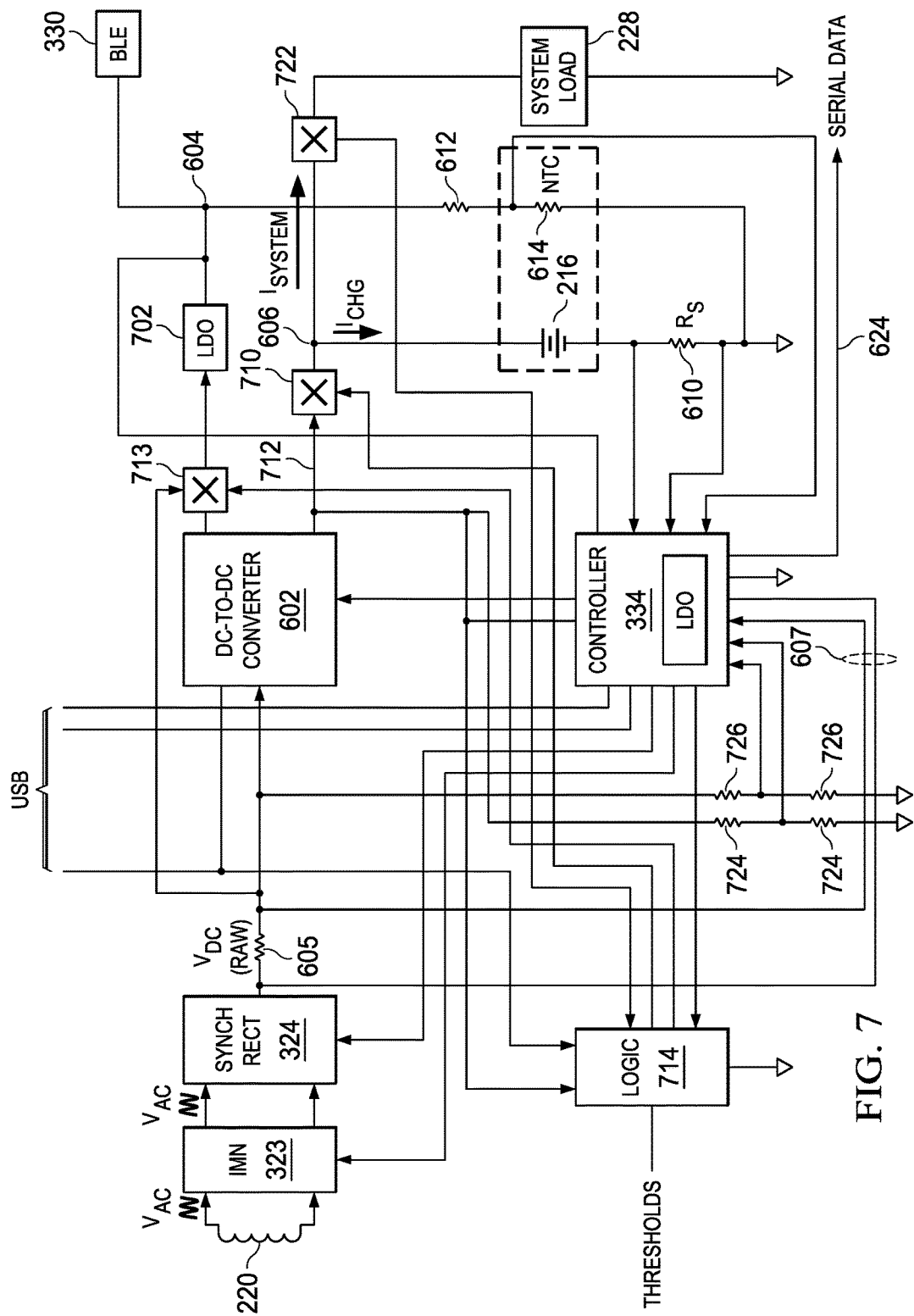
FIG. 7 illustrates a more detailed block diagram of the embodiment of FIG. 6.

From an overall operational standpoint, the controller 334 is operable to control the matching network 323 and the synchronous rectifier 324 in order to control the voltage level to the input of the DC-to-DC converter 602. In FIG. 7, the voltage line 604 is illustrated as being output from an LDO 702. This LDO 702 can alternatively be integrated with the DC-to-DC converter 602 or it can be separate and driven by the DC-to-DC converter 602, as illustrated in FIG. 7. There could actually be a bypass of the DC-to-DC converter 602 via a switch 713 in order for the input to the LDO 702 initially to be connected to the output of the synchronous rectifier 324. Since the power required by the BLE from line 604 is relatively small, very little power loss will be incurred within the LDO 702. Once the voltage on the node 606 is sufficiently high, i.e., when the battery to 16 sufficiently charge, the switch 713 can switch the input to the LDO 702 over to the output of the DC-to-DC converter 60248 more efficient operation.

In a situation where the battery voltage on battery 216 has been depleted below a level that can supply power to the overall device, the device will power down. The controller 334 will typically have some type of power down algorithm that will allow critical data to be stored in nonvolatile memory and the overall system will also do the same. Upon restoration of power, i.e., the battery 216 being charged up to an appropriate level or an external power source being provided, both the controller 334 and the system will power backup in accordance with their normal operation. However, if no external power source is provided, it is necessary for the power to be received from the PTU 102. In the operation of the WPT system, a minimum amount of power is required order to drive power to the primary coil 206. Until sufficient power is delivered thereto, potentially there would be insufficient power delivered to the PTU 204. However, as noted hereinabove, the WPT system operates in a Beacon mode, wherein the PTU 102 is activated periodically to generate a low level of power which is basically a request to any PRU 204 that is within its magnetic field. Since the power provided in the Beacon mode may be insufficient to deliver enough power to power the controller 334 or the BLE in communication module 330, there must be some type of fully discharged battery protocol that is initiated at the PTU 102. (Of course, the Beacon pulse could be long enough to generate sufficient power to enable BLE communications or the PTU could extend the Beacon pulse to a long Beacon pulse once the PTU detects an impedance change.) This protocol could be initiated based upon some type of physical proximity sensor or some type of button that could be pushed on the PTU 102, as one example, but other techniques could be employed. Thus, during a predefined interval associated with this fully discharged battery protocol initiated at the PTU 102, a higher level of power is provided on the output of the PTU 102. Again, this higher level of power is provided before any communication link is established between the PTU 102 and the PRU 204.

Operationally, this will require a power up of the controller 334 and a power up of the BLE associated with the communication module 330 at the least. Illustrated in FIG. 7 is an isolation switch 710 disposed between the output of the DC-to-DC converter 602 on a node 712 and the line 606. This will isolate the battery 216 from the output of the DC-to-DC converter. The output of the LDO 702 powers the controller 334, which has an internal LDO regulator associated therewith and also the LDO 702 powers a logic block 714. This logic block 714 is a block of combinatorial logic. In addition, the output of the DC-to-DC converter is a bypass to provide an output to the LDO 702 to provide a regulated voltage on the node 604 that will power the BLE on the communication module 330. Since the battery 216 has been disconnected from the system via the switch 710 and, also, the system load 228 associated there with, there is very little current draw on the output of the DC-to-DC converter. However, the low battery voltage on the battery 216 will actually pull the voltage on the node 606 low if connected to the node 712. By isolating the battery 216 from the node 712, the system can be stabilized prior to initiating a charging operation. Further, a switch 722 is provided for isolating the node 606 from the system load 228 to allow charging of a fully discharge battery prior to providing power to the system load 228. The logic block 714 can operate on very low voltages and, with battery 216 being isolated by the switch 710, the voltage on the output of the LDO 702 will increase to a level sufficient to power the controller 334 and the BLE on the communication module 330. Once this occurs, the controller 334 via the serial data bus 624 can interface via the BLE on the communication module 330 with the PTU 102. This will allow the power to be increased to a sufficient level to begin to raise the voltage on the output of the DC-to DC converter 602 on the node 712. This voltage is divided down by a resistor divider 724 for input to the controller 334 and the voltage on the input to the DC-to-DC converter 602 is divided down by a voltage divider 726 for input to the controller 334. The logic block 714 also receives as an input the voltage on the node 712 to determine when to open the switch 710 battery to be charged. The controller 334 also is allowed to communicate with the logic block 714 to facilitate this operation.

Prior to the controller 334 being powered up, the logic block 714 will be operable to control the switches 710 and 712. However, the matching network 323 and the synchronous rectifier 324 will operate in a static mode such that a predefined matching impedance will be presented to the coil 220 and the synchronous rectifier 324 will operate as a conventional synchronous rectifier, as will be described hereinbelow. It is only when the controller 334 is powered up and charging is initiated to the battery 216 that control of the matching network 323 and the synchronous rectifier 324 will be facilitated. Thus, once the switch 710 is open, the controller 334 will control both the matching network 323 and the synchronous rectifier 324 in order to minimize the voltage drop across the DC-to-DC converter 602 since it can measure the voltage on both sides of the DC-to DC converter 602. This is facilitated by increasing the voltage drop across each of the matching network 323 and the synchronous rectifier 324. This is contrary to the normal operation of these two devices wherein they would normally be designed from a static standpoint to provide the least loss therein, i.e., they would be designed for maximum efficiency. In this disclosed embodiment, as described herein, the efficiency is actually decreased in order to minimize the amount of heat that is dissipated in the DC-to-DC converter 602.

During charging of the battery 216, the current there through will be monitored to minimize the current for the purpose of limiting the maximum charging current for situations wherein such batteries as lithium ion batteries are charged and also to control the temperature thereof, which is sensed by the NTC resistor 614. Thus, the voltage across the battery 216 will initially be very low and it will increase as charging progresses. By sensing the voltage on the node 712 and, thus, the voltage on the node 606, the logic block 714 can determine when the voltage on the node 606 is sufficiently high enough to open the switch 722 in order to provide power to the system load 228. Alternatively, the output of the DC-to-DC converter 602 could be switched directly to connect to the system load 228 and indirectly switched to connect to the battery 216 through a charging circuit (not shown). In this manner, the output of the DC-to-DC converter 602 would drive sufficient current to the system load 228 at a sufficiently regulated voltage and then current "metered" to the battery 216 in a sufficient amount to both charge the battery 216 (keeping in mind that a lithium-ion battery has a limited amount of current that can be driven thereto) and drive the system load 228, with the current and power requirements of the system load 228 overriding the amount of current that would be used to charge the battery 216. This just requires a different configuration of switches (not shown) to independently disconnect the battery 216 from the system load 228 and drive the system load 228 directly from the DC-to-DC converter 602 independent of the charge directed to the battery 216.

Figure 8A:
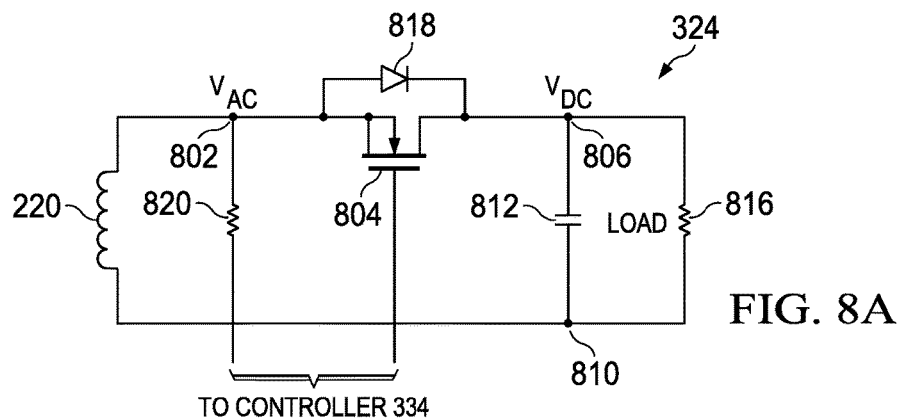
FIGS. 8A-8D illustrate a schematic of the Synchronous Rectifier and associated waveforms.

Referring now to FIG. 8A, there is illustrated a schematic diagram of the synchronous rectifier 324. In one embodiment, the synchronous rectifier 324 can be implemented with a half-wave rectifier. The coil 220 is illustrated without the IMN 323 for illustrative purposes. The AC voltage from the coil 220 will be input on a node 802 and a series N-channel transistor 804 will be disposed between the node 802 and a DC node 806 has an output DC voltage level. The coil 220 is connected between the node 802 and a ground node 810. A capacitor 812 is connected between the DC node 806 and the ground node 810, and a load 816 is connected in parallel with the capacitor 812. The transistor 804 has a body diode 818 connected in parallel therewith with the anode thereof connected to node 802 and the cathode thereof connected to node 806. Additionally, a parallel diode could be disposed between nodes 802 and 806 in a similar orientation. If the transistor 804 is turned off, the body diode 818 will conduct when the voltage on the node 802 is higher than the voltage on the node 806.

A zero crossing sense resistor 820 is connected on one side thereof to the node 802 and the other end thereof is connected to the controller 334. The controller 334 is thus provided the ability to determine the zero crossing of the AC input signal input to the synchronous rectifier 324 and the level of the AC voltage thereon. The gate of transistor 804 is controlled by the controller 334. When the voltage on the node 802 rises above the voltage on the node 806, the transistor 804 is turned on by the controller 334 to charge the capacitor 812. Alternatively, the diode 818 can charge the capacitor 812 when the voltage on the node 802 rises above the voltage on the node 806. When the voltage on the node 802 falls below the voltage on the 806, the transistor 804 is turned off or, alternatively, the diode 818 is reverse biased and is nonconductive.

Figure 8B:
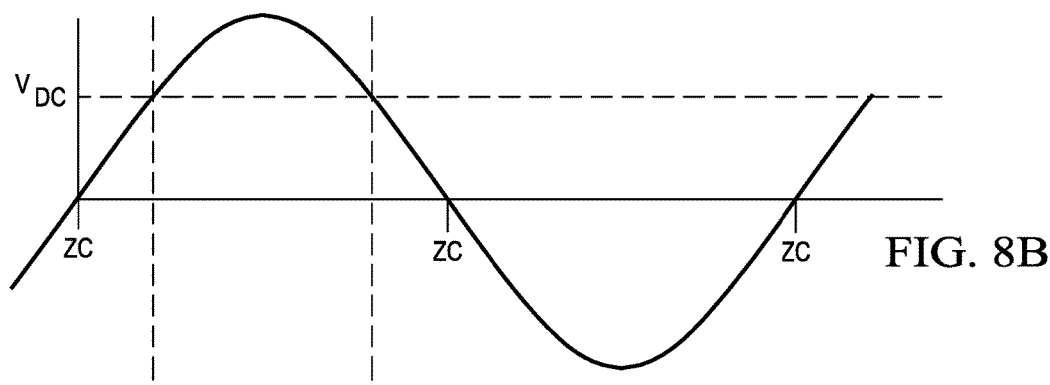
Figure 8C:
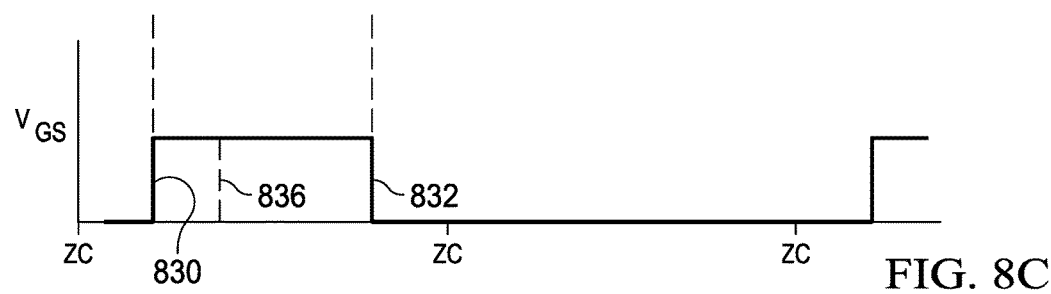
Figure 8D:
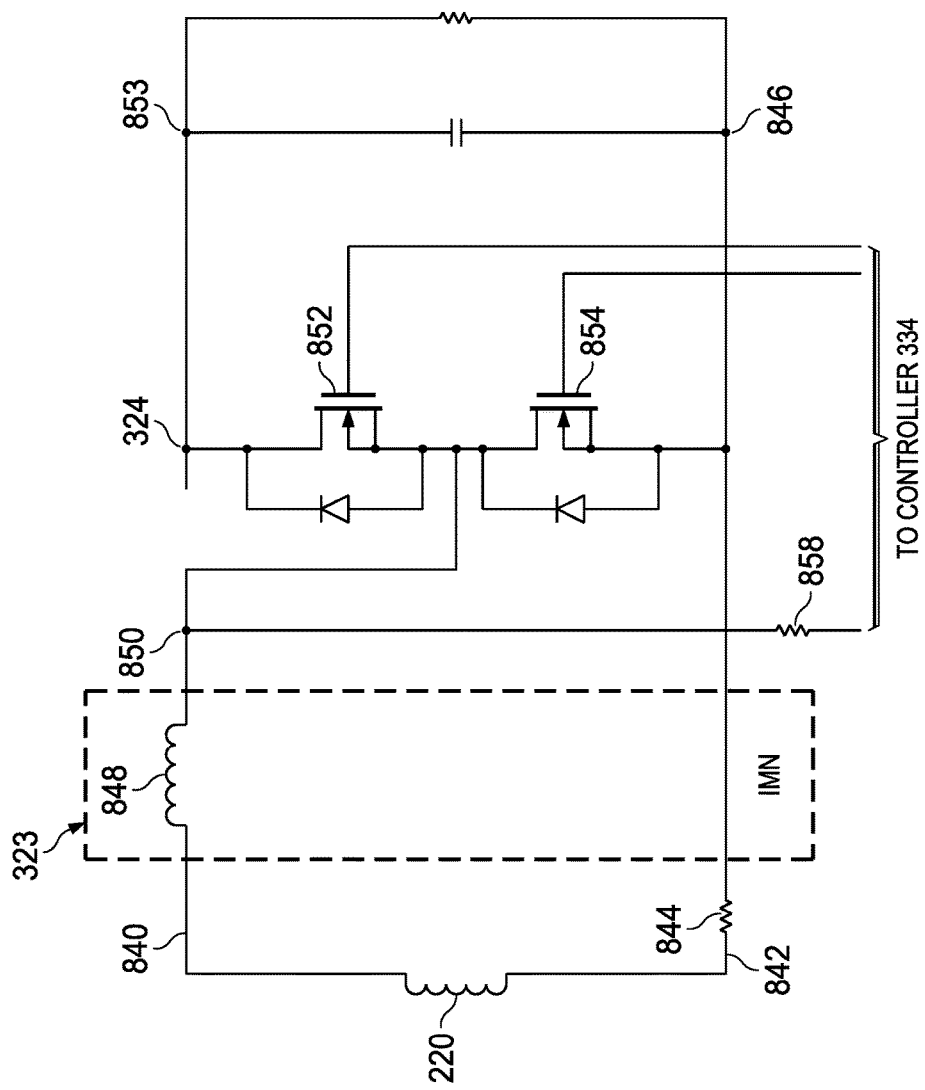

Referring now to FIG. 8B and FIG. 8C, there are illustrated waveforms for the AC signal and the gate control voltage for the transistor 804. The AC signal input to the synchronous rectifier 324 will have zero crossings labeled as ZC. When the crossing is positive going, this will indicate the positive half of the waveform. When the signal is negative going, this will indicate the negative half of the waveform. The controller 334 can determine first, when the zero crossing is positive going and, second, when the voltage associated therewith on the node 802 is greater than the voltage on the node 806. This can be sensed through resistor 820 and also on the voltage sensing line on the input to the DC-to-DC converter 602. If a diode conducts instead of the transistor 804, the diode 818 would have a self-turn on and a self-turn off and would not require any control by the controller 334.

Thus, when the controller 334 is controlling the transistor 804, the gate voltage will be raised high at a transition 830, which will occur after a positive going zero crossing or as close thereto as is determined by the controller 334 and also when the voltage on node 802 is above the voltage on node 806. When the voltage on node 802 falls below the voltage on node 806, the gate voltage will be pulled low at a transition 832. When the voltage on the node 802 is higher than the voltage on the node 806, this will result in current being delivered to the capacitor 812 during the positive half of the AC waveform. If the transistor 804 is controlled to be conductive between transition 830 and transition 832, this provides the most efficient operation for the synchronous rectifier 324. If the diode were utilized during any portion of this time, this would result in a loss due to the voltage drop across the diode. However, the control of the transition 804 can be varied as indicated by a dotted line 836. The dotted line 836 represents a gate voltage transition that occurs later in time from the point at which the voltage on node 802 exceeds the voltage on node 806 by a predetermined amount. By controlling the width of the pulse between the transition 830 to the transition 836 and, thus, the distance to the transition 832, the amount of energy transferred from the node 802 to the node 806 can be varied. Of course, when the transistor 804 is nonconductive, the diode 818 will be conductive during the time the voltage on the node 802 is above the voltage on the node 806. Thus, the maximum loss in the synchronous rectifier 334 in this embodiment would be the loss through the diode 818 when the transistor 804 is completely turned off. Further control can be provided by placing two transistors in series between node 802 and node 806. When both transistors are turned off, this will result in a voltage drop of two diode voltage drops. There would be two transistors in parallel with diodes and by controlling these two transistors, and both transistors could be on for the most efficient operation, one could be turned off or both could be turned off for the least efficient operation. For example, with silicon diodes, the voltage drop is 0.7 V. The voltage drop between node 802 and node 806 can be controlled with the single transistor 804 to vary the voltage drop thereacross between 0.0 V and 0.7 V. With two series connected transistors and series connected diodes in parallel therewith, the voltage drop thereacross can be varied between 0.0 V and 1.4 V.

Another technique that can be implemented is to have two series connected transistors with the body diodes connected in opposite directions. This will always block current when both transistors are off and thus act as an open since one of the body diodes will always be off. Using this type of connection, the DC voltage can be changed at the output of the synchronous rectifier by changing the duty cycle when both transistors are on. This provides an alternate method to change the DC voltage at the output of the synchronous rectifier. Thus instead of turning on both devices at the zero crossing, they are turned on "later" (smaller duty cycle) to generate a lower voltage. The maximum voltage occurs when they are turned on at the zero crossings.

One possible issue with this technique described above is start up since there will not be enough voltage to control the switches. Thus, passive diode rectifiers may still be needed during start-up but could be connected in a parallel configuration to give power to the gate-control circuitry while the main battery and system path is controlled by the double switch synchronous rectifier described above.

In an alternate embodiment, as disclosed in U.S. Pat. No. 9,384,885, issued Jul. 5, 2016, entitled Tunable Wireless Power Architectures, assigned to the present Assignee and which is incorporated by reference herein in its entirety, an alternate and tunable synchronous rectifier is illustrated. The coil 220 is connected between a node 840 and a node 842 with a series resistor 844 connected between node 842 and a ground node 846. The IMN 323 includes, by example, and inductive element 848, in one example. The IMN 323 is connected between node 840 and a node 850, the input to the synchronous rectifier 324. The synchronous rectifier 324 is comprised of two series connected transistors 852 and 854 connected between a node 853 and the node 846. Transistor 854 is connected between node 846 and the node 850 and transistor 852 is connected between the node 846 and a node 853. The gates of transistors 852 and 854 are controlled by the controller 334. A zero crossing resistor 858 is connected between the node 850 and the controller 334 for sensing the voltage on the node 850 and the zero crossing point. In operation, when the voltage on the node 850 is above the voltage on the node 852, transistor 852 is turned on to conduct. When the voltage on the node 850 goes negative and falls below the voltage on the node 846, the transistor 854 is turned on to actually conduct during the negative half of the waveform.

It should be understood that, although a half wave rectifier is illustrated, a full wave rectifier could be realized and implemented. All that is necessary is to have the ability to control the Gates of transistors or controllable conductive elements utilized for the synchronous rectifier. A transistor is just one example of a controllable conductive element.

Figure 9A:
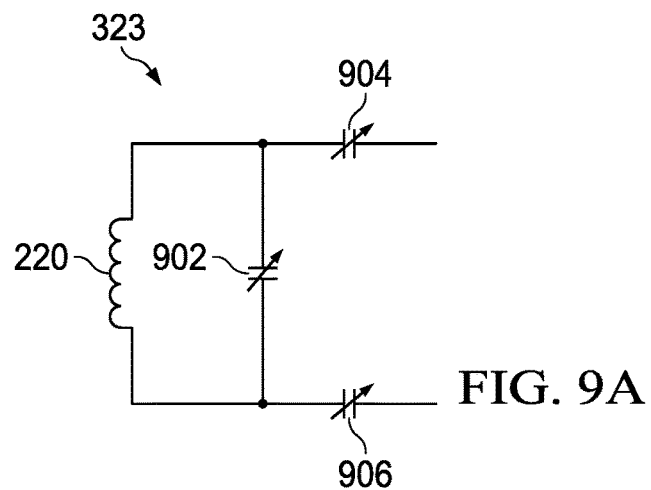
FIGS. 9A and 9B and 9C illustrate schematic diagrams of the Impedance Matching Network.
Figure 9B:
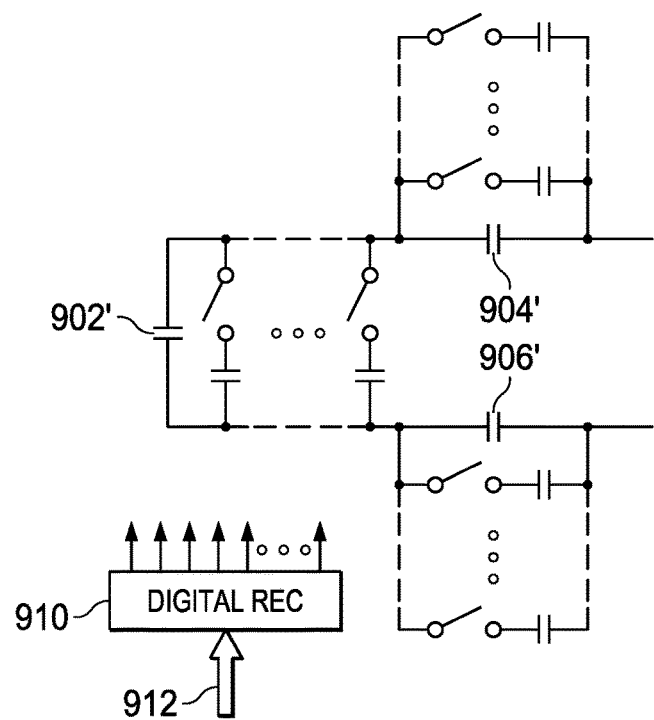

Referring now to FIG. 9A and FIG. 9B, there is illustrated a block diagram of the matching network 323. The matching network 323 is configured, in this embodiment, with a variable capacitor 902 connected across the coil to 20 and a first series capacitor 904 connected to one side of the coil 220 and a second series capacitor 906 connected to the other side of the coil 220, the two capacitors 904 and 906 being variable capacitors. These are illustrated in more detail in FIG. 9B, wherein the capacitors 902, 904 and 906 are realized with binary weighted capacitors. Thus, each capacitor "bank" is comprised of an initial value capacitor, 902', 904' and 906', respectively, for each of the capacitors 902, 904 and 906. Each of the capacitors 902, 904 and 906 will have additional capacitors that are selectively switched in parallel with its respective initial capacitor. Each of the overall bank of capacitors is binary weighted such that there will be an initial capacitor C followed by capacitors C/2, C/4, C/8, etc. Of course, it could be that the initial fixed capacitor could in the middle of the binary weighted range such that the initial capacitor could be increased or decreased. This is facilitated via a digital register 910 which contains a value for all of the three capacitor banks. The digital value that is input to the digital register 910 is received from a digital bus 912 from the controller 334. However, initially the base capacitor will be the value prior to any activation of the switches associated with each of the capacitors in the binary weighted arrangement.

Figure 9C:
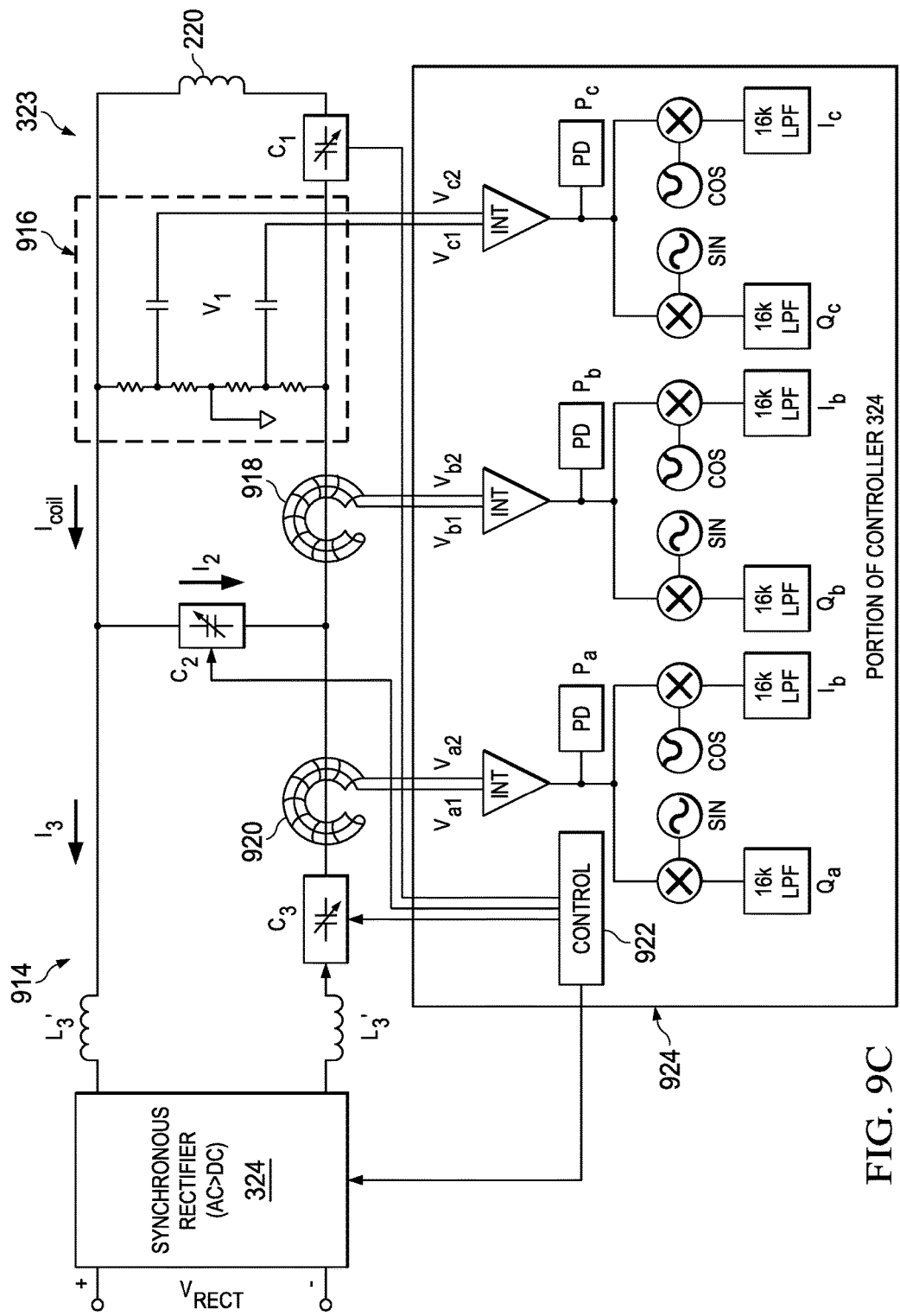

Referring now to FIG. 9C, there is illustrated an example of a receiver 914 with a tunable impedance matching network 323. The receiver 914 includes a resonator coil 220 coupled in series to capacitor $C_1$. Next, connected in parallel to the resonator coil and $C_1$, is a voltage sensor 916 that measures voltage $V_1$. The differential voltage measurements $V_{c1}$, $V_{c2}$ are fed into integrator INT. In embodiments, a peak detector PD is used to detect the amplitude P (as function of time) of the measured voltage signal $V_1$. The voltage signal is also fed into a mixer (SIN and COS) and one or more filters (LPF) to detect the phase of the voltage signal $V_1$. The amplitude and phase measurements can be used by a controller to tune system components, such as the tunable capacitors $C_1$, $C_2$, and $C_3$, or control other parts of the receiver, such as rectification or safety mechanisms.

Next, coupled in parallel to the voltage sensor 916 is capacitor $C_2$. A current sensor 918 can be positioned between voltage sensor 916 and capacitor $C_2$ to measure coil current $I_{coil}$. Coupled in series to the $C_2$ is a capacitor $C_3$. A current sensor 920 can be positioned between $C_2$ and $C_3$ to measure current $I_3$. Each of these current sensors 918 and 920 can be connected to amplitude and phase measurement circuits as described above for voltage sensor 916. Coupled in series to capacitor $C_3$ is inductor $L'_3$ (balanced) and synchronous rectifier 324. In embodiments, the synchronous rectifier 324 can be an active rectifier, such as a synchronous rectifier. The rectified voltage output $V_{rect}$ may be fed directly to a load or though other circuitry, such as voltage clamps or filters.

In some embodiments, tunable capacitors $C_1$, $C_2$, and $C_3$ may be controlled by a controller or processor 922. Note that the outputs of the various sensors 916, 918, and 920 can be fed into component 922. The controller 922 in addition to some or all of components INT, PD, SIN and COS, and LPF may be integrated into an integrated circuit 924, such as an ASIC.

The input signal may be a signal representing a measured current or voltage at a location within a power transfer system. The input signal may be, for example, a voltage signal representing a measured current or voltage at a location within a power transfer system, and can be represented by $A_{IN}*\sin(\omega t+\varphi)$, where $\varphi$ is the phase of the input signal relative to the reference signals. For example, the input signal can be the output of a Rogowski coil positioned within the circuitry of a power transfer system to measure a current signal.

The signal mixers are coupled with the signal supply (such as the voltage signal $V_1$) so as to receive one of the reference signals as one input and the input signal as another input. The mixers (SIN and COS) mix (e.g., perform time-domain multiplication) a respective reference signal with the input signal and output mixed signal 1 and 2. Thus, mixed signal 1 can be represented by:

$$Q = A_{IN}*\sin(\omega t+\varphi)*A*\sin(\omega t) = \frac{AA_{IN}}{2}*\cos(\varphi) - \frac{AA_{IN}}{2}*\cos(2\omega t+\varphi),$$

and mixed signal 2 can be represented by:

$$I = A_{IN}*\sin(\omega t+\varphi)*A*\cos(\omega t+\theta) = \frac{AA_{IN}}{2}*\sin(\varphi-\theta) + \frac{AA_{IN}}{2}*\sin(2\omega t+\varphi+\theta).$$

Filters (LPF) can be low-pass filters designed to filter, for example, the second harmonic from the first and the second mixed signal that is generated by the mixers. Accordingly, the filters may remove the second order harmonics generated from the signal mixing process as well as any higher order harmonics that were present in either reference signals or the input signal. After filtering, mixed signal 1 can be represented by:

$$Q = \frac{AA_{IN}}{2}*\cos(\varphi),$$

and mixed signal 2 can be represented by:

$$I = \frac{AA_{IN}}{2}*\sin(\varphi-\theta).$$

The controller receives the mixed signals Q and I, determines the phase of the input signal, and outputs the phase of the input signal to, for example, IMN control circuitry. Impedance at the operating frequency can be determined using a ratio of Q to I. In embodiments, the impedance can be input to detection algorithms such as rogue object detection, foreign object detection, RFID detection, proximity detection, coil alignment, and the like.

Figure 10:
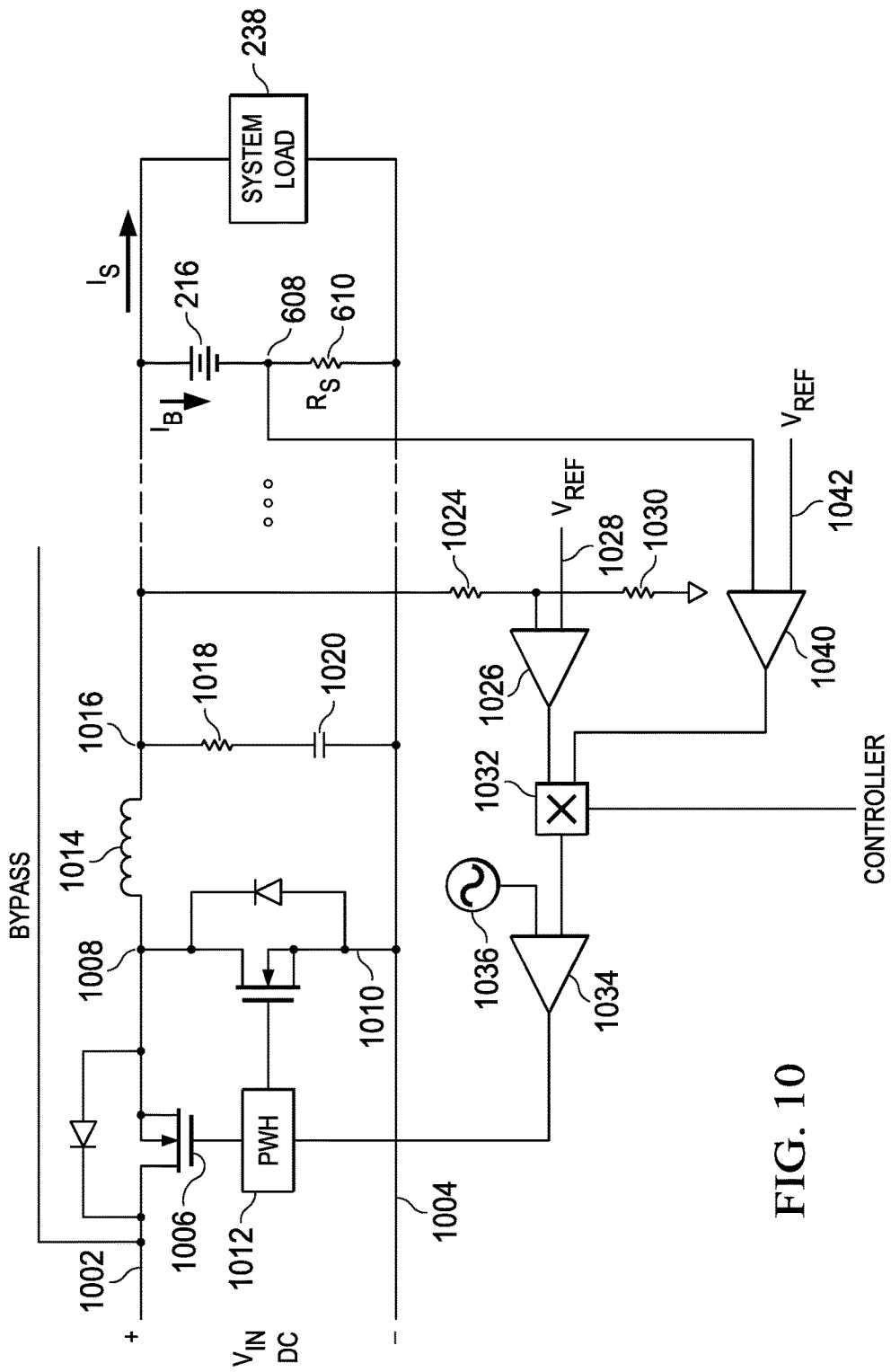
FIG. 10 illustrates a schematic diagram of the DC-DC converter.

Referring now to FIG. 10, there is illustrated a schematic diagram of one example of the DC-to-DC converter 602 with the LDO bypass. The DC input voltage is received across two nodes, a node 1002 and a ground node 1004. This is the raw DC input voltage output by the synchronous rectifier 324. This is a buck converter for lowering the voltage. A first transistor switch, an N-channel transistor, 1006 is connected between node 1002 and a node 1008 with a transistor 1010 connected between node 1008 and the ground node 1004. Both transistors 1006 and 1010 have the gates thereof controlled by a pulse width modulation circuit 1012, both being N-channel transistors. The node 1008 is connected to one side of a coil 1014, the other side thereof connected to a node 1016. Node 1016 is connected to one side of a series connected resistor 1018 and capacitor 1020 and ground node 1004. There are two feedback controls. A voltage feedback and a current feedback. For voltage feedback, node 1016, the voltage output node, is input to a resistor 1024 to the input of an amplifier 1026, the other input thereof connected to a reference voltage on a node 1028. The resistor 1024 at the input of amplifier 1026 is connected to the top of a resistor 1030, the other side thereof connected to ground, such that the resistors 1024 and 1030 provide a resistor divider to the voltage on the node 1016. The output of the amplifier 1026 is selected by a switch 1032 by the controller for input to one input of an amplifier 1034, the other input thereof connected to the output of oscillator 1036. The output of the amplifier 1026 provides an error voltage that is provided to the amplifier 1034 as a threshold reference level to the amplifier 1034 for comparison to the voltage output of the oscillator 1036 to provide a triangle wave output for input to the pulse width modulator 1012. The pulse width modulator 1012 converts this output into pulses for controlling the transistors 1010 and 1006.

In a current regulation mode, the current sense voltage on the node 608 at the top the sense resistor 610 is provided as an input voltage to an amplifier 1040, the other input thereof connected to a reference voltage 1042. These reference voltages either the node 1028 or the node 1042 can be fixed voltages or they can be generated by the microcontroller 334. The switch 1032 is operable to select either current regulation or voltage regulation. Initially, the system will be in a voltage regulation mode to provide an output voltage at a fixed voltage. However, during charging, it may be desirable to limit the charging based upon current regulation. For example, lithium-ion batteries have a limit to the amount current then can be driven thereto during charging. Thus, by using a current regulation mode, the voltage can be regulated as a function of current rather than as a function of an absolute output voltage level.

Figure 11:
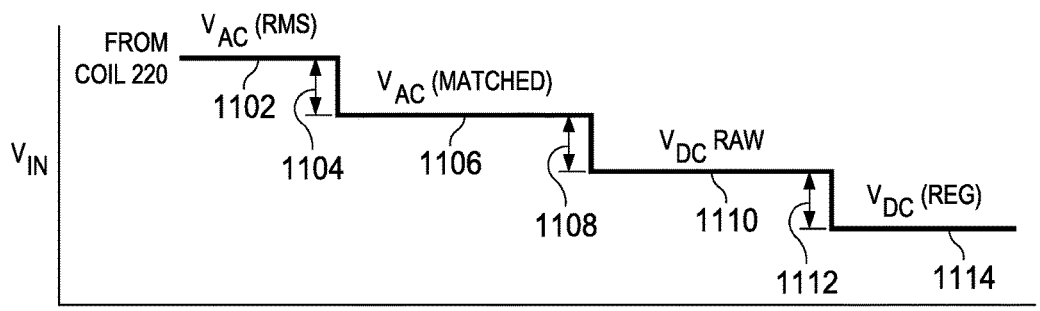
FIG. 11 illustrates a diagrammatic view of the voltage distribution across the Power Receiving Unit.

Referring now to FIG. 11, there is illustrated a diagrammatic view of the voltage distribution from the output voltage of the coil 220 to the output of the regulator 602. The voltage output from the coil is a first voltage level, an AC voltage, 1102. This is then reduced by a voltage level 1104 to an AC voltage level 1106 $V_{AC(MATCHED)}$ at the output of the matching network. Thus, the voltage drop across the matching network is a voltage drop 1104. (It should be noted that this could actually be a voltage increase.) There is then another a voltage drop 1108 across the synchronous rectifier resulting in output level of 1110 at the output of synchronous rectifier. There is then a final voltage drop 1112 across the voltage regulator (DC-to-DC converter 602) to result in a voltage 1114 on the output of the voltage regulator (DC-to-DC converter 602). (It should be noted that this could actually be a voltage increase if it were a buck-boost converter.) If the configuration of both the Impedance Matching Network 323 and the Synchronous Rectifier 324 were controlled to obtain the maximum efficiency therefor, i.e., the smallest loss, then the voltage drops 1104 and 1108 would be defined in accordance there with. In this case, the voltage drop 1112 across the voltage regulator 326 would be a function of the voltage across the coil 220 less the total voltage drop across the IMN 323 and the Synchronous Rectifier 324. By allowing variation of the loss in the matching network IMN 323 and the synchronous rectifier 324 to be controlled through the configuration thereof, this allows the controller 334 to control the voltage drops 1104 and 1108 to minimize the voltage drop 1112 across the voltage regulator 326. There is a minimum level that is required in order for the regulator to operate. By reducing this voltage drop 1112 to the minimum level required for the voltage regulator to operate, the amount of heat dissipated in the voltage regulator can be reduced.

Figure 12:
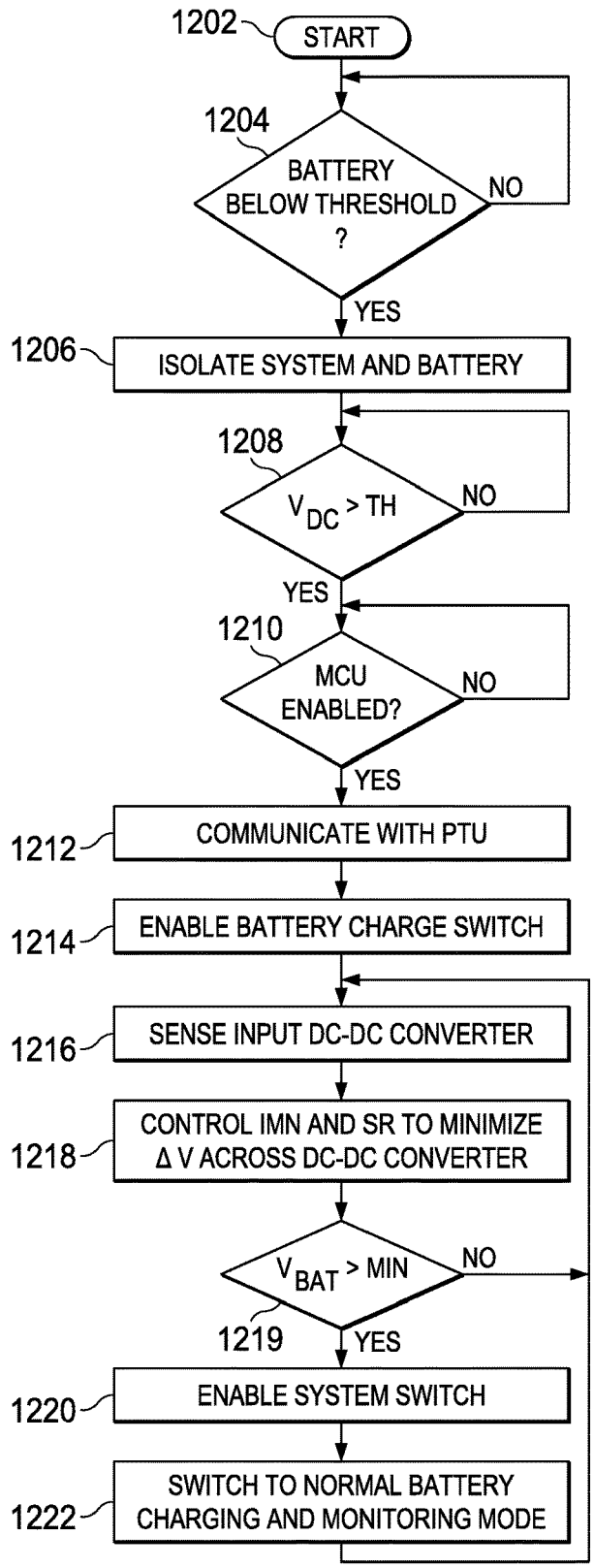
FIG. 12 illustrates a flowchart depicting the overall operation of the system.

Referring now to FIG. 12, there is illustrated a flowchart for the overall operation. This is initiated at a block 1202 and then flows to a decision block 1204 to determine if the battery is below threshold of operation, i.e., it is a depleted battery. The program then flows to a function block 1206 to determine if such is the case to basically isolate the system and the battery. As the battery is depleted, it is first important to power up the overall PRU 204. The program then flows to a function block 1208 to determine if the DC voltage is above threshold, i.e., there is sufficient power from the Beacon mode or the battery depletion mode of the PTU 102. If so, the program then flows to a function block 1210 to determine if the controller 334 has been enabled, i.e., if there is sufficient voltage to allow it to operate. Again, since the system and battery have been isolated, there is no significant current draw other than that associated with logic block 714 and the controller 334. Additionally, these circuits can be designed to operate on very low voltages. When the controller 334 is enabled, the program flows to a block 1212 to then communicate with the PTU 102, i.e., there is sufficient power to both enable the controller 334 and the BLE. The program then flows to a function block 1214 to enable the battery charge switch, as communication with the PTU 102 will allow the PTU 102 to increase its power level. It is noted that, until there is some type of communication link, the PTU 102 will not try to drive sufficient power for any device, i.e., communication is first required for any power delivery at any charging level. All the initial mode for setting up the system does is to provide just enough power to enable communications and the local blocks within the PRU 204 allow the IMN 323 and Synchronous Rectifier 324 and regulator 326 to be configured in order to optimize power flow. The program then flows to a function block 1216 to sense the input to the DC to DC converter for setting the voltage drop 1112. The program then flows to a function block 1218 in order to control the matching network and the synchronous rectifier to minimize the voltage drop 1112 by distributing the voltage drop to the matching network and synchronous rectifier via the voltage drops 1104 and 1108. The program then flows to a decision block 1219 to determine if the battery voltage is above a minimum, that being the minimum required to power the system. If so, the program flows to a function block 1220 in order to enable the system switch to actually power the system load 228. As mentioned above, this operation can be performed in parallel to the battery charging operation with a different switch configuration. Once the system is in normal operating mode, as indicated by block 1222 wherein the overall system switches to a normal battery charging and monitoring mode, the system can operate to monitor all of the voltages and optimize power to the system for both charging and powering the system load 228.

Figure 13:
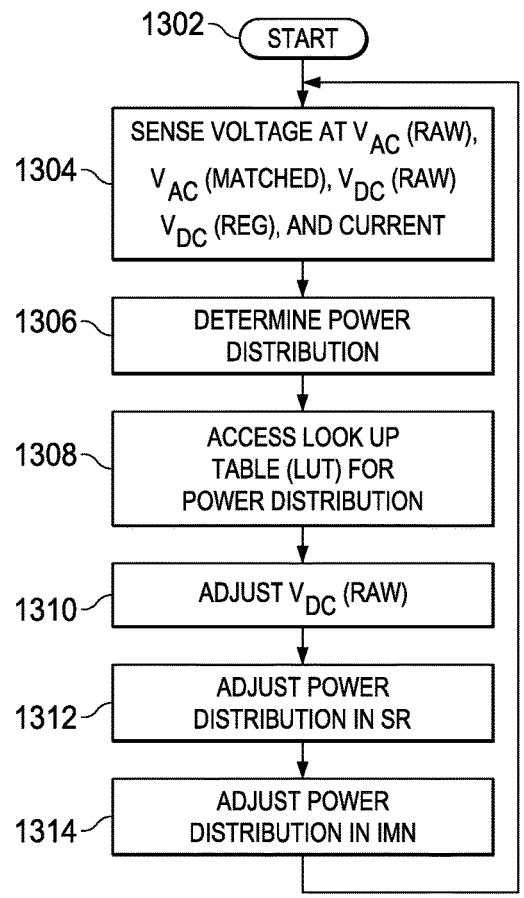
FIG. 13 illustrates a flowchart depicting the overall power distribution operation during static operation.

Referring now to FIG. 13, there is illustrated a flowchart depicting the operation of the overall system will power distributed between the input blocks. As described hereinabove, there are three blocks where in the power dissipation therein can be adjusted. They are the IMN 323, the synchronous rectifier 324 and the DC-to-DC converter 602. The controller 334 provides control for all three of these blocks. This control is facilitated upon knowing the input and output voltages across each of the blocks and the current there through in order to determine the overall power budget that is to be distributed. The IMN 323 is basically comprised of passive elements and any adjustment of the values of these passive elements will result in internal loss therein or loss through mismatch at the coil 220. The synchronous rectifier 324 will basically incur loss through the diodes, with the most lossy configuration being that where only the diodes are utilized as the conductive elements. The DC-to-DC converter 602, by comparison, is a nonlinear regulator and, as such, raising the voltage there on does not result in direct IR loss. However, there will be an increase loss as the voltage increases, which will result in dissipation of heat. Thus, the main control for the DC-to-DC converter 602 is control of the input voltage thereto.

The flowchart of FIG. 13 is initiated at a start block 1302 and then proceeds to a function block 1304. The controller 334 measures the voltage at the input to the IMN 323 at the output of the coil 220, which is the input voltage to the synchronous rectifier 324. The output DC voltage from the synchronous rectifier 324 is measured as well as the current through the current shunt resistor 605, this being the DC input voltage and current to the DC-to-DC converter 602. The current through the current shunt resistor 605 represents the series current through the entire chain of blocks. The output voltage of the DC-to-DC converter 602 is then measured on node 606. The program then proceeds to a function block 1306 in order to determine the power distribution from an internal lookup table. The program then proceeds to a function block 1308 wherein power distribution lookup tables are accessed from stored memory, which stored memory is associated with the controller 334, or this memory could be external memory (not shown).

These lookup tables are generated in accordance with different algorithms for different power distribution scenarios. There may be scenarios where the power distribution is evenly distributed between the blocks or unevenly distributed. There can be algorithms wherein for, higher voltages on the output of the coil 220, the power distribution differs. Further, a measurement of the temperature utilizing the NTC 614 and be used to adjust the power distribution between the blocks (and other locations in the system can have similar temperature measuring devices). Even further, the DC-to-DC converter 602 can be configured to operate as a voltage mode DC-to-DC converter or as a current mode DC-to-DC converter, wherein the current can be limited through the current mode configured DC-to-DC converter in accordance with a power distribution configuration. This will allow, for example, the current through the DC-to-DC converter to be limited based upon, for example, a high temperature indication from the battery temperature sensor. Once the power distribution table is pulled up and a power distribution configuration is determined, then it is just a matter of the controller 334 outputting the appropriate control signals to vary the configuration of the IMN 323 and change the switching control signals for the synchronous rectifier 324 to adjust the voltage input to the DC-to-DC converter 602 to the desired input voltage level. This is illustrated in the three function blocks 1310, 1312 and 1314. The program then returns back to the input of the function block 1304.

As described above, the Wireless Power Transfer system utilizes a BLE to transmit information back to the PTU from the PRU in order to adjust the power level. However, in a straightforward and simple charge only operation utilizing a "dumb" charger, there is no control of the voltage or power output by the actual PTU. All that can be done is to possibly have a proximity sensor that determines the proximity of the device associated with the PRU being within the magnetic charging field of the PTU to turn it on or there being a user activated switch on the PTU with some type of timeout operation. Alternatively, the device could remain in and on condition permanently. The device associated with PRU, and having a battery associated there with, as an example, is then placed within the magnetic field of the PTU and the battery charged. The system would work as described hereinabove with the exception that no feedback was provided to the PTU. Thus, no communication path is provided for.

It will be appreciated by those skilled in the art having the benefit of this disclosure that this wireless battery charger provides a distributed loss across the WPT circuitry in the PRU. It should be understood that the drawings and detailed description herein synchronous are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A wireless battery charging system, comprising:
   an inductive receiving member for coupling to an inductively generated AC signal;
   a matching circuit having a variable impedance for presenting a desired impedance to the inductive receiving member and having variable matching parameters, the matching circuit interfacing an AC signal output by the inductive receiving member to a first AC signal output;
   a rectifier circuit for converting the first AC signal output to a first DC voltage and having variable rectifier parameters to vary a first voltage drop thereacross;
   a DC-to-DC voltage converter for converting an output of the rectifier circuit to a regulated voltage lower than the first DC voltage, an output of the DC-to-DC voltage converter charging the battery;
   a current sensor for sensing series current through the matching circuit, rectifier circuit and DC-to-DC voltage converter;
   a memory for storing a plurality of discrete predetermined power distribution configurations, each of the power distribution configurations associated with a separate power distribution scheme and each based on sensed voltages on an input of the matching circuit, an input of the rectifier circuit and an input of the DC-to-DC voltage converter in addition to the current sensed by the current sensor as determinative factors for power distribution; and
   a controller sensing a second voltage drop across each of the matching circuit, rectifier circuit and DC-to-DC voltage converter and the current through the current sensor and determining power dissipation in each of the matching circuit, rectifier circuit and DC-to-DC voltage converter; and
   the controller adjusting the variable matching parameters in the matching circuit, the variable rectifier parameters in the rectifier circuit and a voltage input to the DC-to-DC voltage converter in accordance with a predetermined power distribution configuration to distribute power thereacross in accordance with an associated power distribution scheme.

2. The wireless battery charging system of claim 1, and further comprising a temperature sensor for sensing a temperature of the battery, the controller determining the temperature of the battery from an output of the temperature sensor, and wherein the power distribution configuration utilizes the temperature of the battery as a determinative factor in the power distribution scheme.

3. The wireless battery charging system of claim 1, wherein the current sensor is a current shunt sense resistor.

4. The wireless battery charging system of claim 1, and further comprising an output for driving a system load, which system load operates in parallel with the battery.

5. The wireless battery charging system of claim 4 and further comprising a battery current sensor for sensing current through the battery.

6. The wireless battery charging system of claim 5, wherein the controller receives as an input the output of the battery current sensor and the power distribution configuration utilizes the current through the battery current sensor as a determinative factor in the associated power distribution scheme.

7. The wireless battery charging system of claim 1, wherein the DC-to-DC voltage converter can be configured as either a voltage mode DC-to-DC voltage converter or as a current mode DC-to-DC converter.

8. The wireless battery charging system of claim 7, wherein the power distribution configuration can implement a power distribution scheme that configures the DC-to-DC converter as a current mode DC-to-DC voltage converter in order to regulate a current through the DC-to-DC voltage converter to a fixed value.

9. The wireless battery charging system of claim 1, wherein the rectifier circuit comprises asynchronous rectifier having variable rectifier parameters to vary the first voltage drop thereacross.

10. A wireless power delivery system, comprising:
    an inductive receiving member for inductively coupling to an external inductive power transmission system;
    a variable impedance matching network for presenting a desired impedance to the inductive receiving member and having variable matching parameters to output a first AC signal output with a variable power dissipation;
    a rectification circuit for rectifying the first AC signal output to a first DC voltage and having variable rectifier parameters to vary the power dissipated thereby;
    a DC-to-DC voltage converter for converting the output of the rectification circuit to a regulated voltage, the output of the DC-to-DC voltage converter for powering an external load;
    a current sensor for sensing series current through the inductive receiving member, rectification circuit and DC-to-DC voltage converter; and
    a controller sensing a voltage drop across each of the variable impedance matching network, rectification circuit and DC-to-DC voltage converter and the current through the current sensor and determining power dissipation in each of the variable impedance matching network, rectification circuit and DC-to-DC voltage converter;

the controller storing in an associated memory a plurality of stored power configurations, each of the stored power configurations defining an associated power distribution scheme for configuration of each of the variable impedance matching network, rectification circuit and DC-to-DC voltage converter, wherein the sensed voltage drop across each of the variable impedance matching network, rectification circuit in the DC-to-DC voltage converter are determinative factors in each of the power distribution schemes; and the controller selecting one of the power distribution schemes and the associated stored power configuration and adjusting the variable matching parameters in the variable impedance matching network, the variable rectifier parameters in the rectification circuit and a voltage input to the DC-to-DC voltage converter in accordance with the selected stored power configuration to distribute power thereacross in accordance with the associated power distribution scheme.

11. The wireless power delivery system of claim 10, and further comprising a temperature sensor for sensing a temperature of the external load, the controller determining the temperature of the external load from the output of the temperature sensor, and wherein the power distribution configuration utilizes the temperature of the external load as a determinative factor in select ones of the power distribution schemes.

12. The wireless power delivery system of claim 11, wherein the external load is a battery.

13. The wireless power delivery system of claim 10, wherein the DC-to-DC converter can be configured as either a voltage mode DC-to-DC converter or as a current mode DC-to-DC converter.

14. The wireless power delivery system of claim 13, wherein each of the power distribution configurations can implement and associated power distribution scheme that configures the DC-to-DC converter as a current mode DC-to-DC converter in order to regulate a current through the DC-to-DC converter to a fixed value.

15. A wireless power delivery system, comprising:
a coil for inductively coupling to an external inductive power transmission system;
a variable impedance matching network for presenting a desired impedance to the coil and having variable matching parameters to output a first AC signal output with a variable power dissipation;
a rectification circuit for rectifying the first AC signal output to a first DC voltage and having variable rectifier parameters to vary the power dissipated thereby;
a DC-to-DC voltage converter for converting the output of the rectification circuit to a regulated voltage, the output of the DC-to-DC voltage converter for powering an external load;
a sensor for sensing parameters of the coil, impedance matching network rectification circuit and DC-to-DC voltage converter that are associated with heat dissipation therein; and
a controller determining power dissipation in each of the coil, impedance matching network, rectification circuit and DC-to-DC voltage converter;
the controller storing a plurality of predetermined power configurations, each of the predetermined power configurations defining an associated power distribution scheme for configuration of each of the variable impedance matching network, rectification circuit and DC-to-DC voltage converter; and
the controller selecting one of the power distribution schemes and the associated predetermined power configuration and adjusting the variable matching parameters in the variable impedance matching network, the variable rectifier parameters in the rectification circuit and the voltage input to the DC-to-DC voltage converter in accordance with the selected predetermined power distribution configuration to distribute power thereacross in accordance with the associated power distribution scheme.

16. The wireless power delivery system of claim 15, wherein the sensor for at least one of the coil, rectification circuit and DC-to-DC voltage converter comprises an external heat sensor for determining heat dissipated by the respective one of the coil, rectification circuit and DC-to-DC converter.

17. The wireless power delivery system of claim 15, wherein the sensor includes at least a current sensor for sensing a series current through the coil, impedance matching network rectification circuit and DC-to-DC voltage converter.

18. The wireless power delivery system of claim 17, wherein the controller sensing the voltage drop across each of the variable impedance matching network, rectification circuit and DC-to-DC voltage converter and a current through the current sensor and determining the power dissipation in each of the variable impedance matching network, rectification circuit and DC-to-DC voltage converter.

19. The wireless power delivery system of claim 15, wherein the controller adaptively determines the stored predetermined power configurations.

* * * * *